United States Patent [19]

Maier et al.

[11] Patent Number: 4,812,989
[45] Date of Patent: Mar. 14, 1989

[54] METHOD FOR EXECUTING MACHINE LANGUAGE INSTRUCTIONS

[75] Inventors: Robert M. Maier, San Jose; Allan J. Zmyslowski, Sunnyvale; Carolee N. Schober, Cupertino, all of Calif.

[73] Assignee: Amdahl Corporation, Sunnyvale, Calif.

[21] Appl. No.: 919,208

[22] Filed: Oct. 15, 1986

[51] Int. Cl.⁴ .................. G06F 7/00; G06F 9/28; G06F 9/20
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,938,103 | 2/1976 | Welin | 364/200 |
| 4,231,085 | 10/1980 | Bazlen et al. | 364/200 |
| 4,300,208 | 11/1981 | Jasmin et al. | 364/900 |
| 4,323,964 | 4/1982 | Gruner | 364/200 |
| 4,342,078 | 7/1982 | Trenedick | 364/200 |
| 4,388,682 | 6/1983 | Eldridge | 364/200 |
| 4,495,563 | 1/1985 | McDonough | 364/200 |
| 4,550,369 | 10/1985 | Rokutanda et al. | 364/200 |
| 4,571,673 | 2/1986 | Horst | 364/200 |
| 4,604,684 | 8/1986 | Epstein | 364/200 |
| 4,631,663 | 12/1986 | Chilinski | 364/200 |
| 4,633,390 | 12/1986 | Yoshida | 364/200 |
| 4,635,188 | 1/1987 | Williamson | 364/200 |
| 4,677,549 | 6/1987 | Katsura et al. | 364/200 |
| 4,691,278 | 9/1987 | Iwata | 364/200 |

Primary Examiner—Gareth D. Shaw
Assistant Examiner—Viet Q. Nguyen
Attorney, Agent, or Firm—Fliesler, Dubb, Meyer & Lovejoy

[57] ABSTRACT

The present invention provides for use in a data processor a method for mapping a respective machine language instruction stored by cache storage unit to a respective microprogrammed algorithm stored in control storage unit means, wherein the respective machine language instruction includes an opcode field with a prescribed value and at least one nonopcode field with one of a plurality of values, the method, comprising the steps of in the course of one data processor clock cycle, providing the respective machine language instruction to a decoder for converting the prescribed opcode field and the at least one nonopcode field of the respective machine language instruction into a respective combination of decoded signals which corresponds to the prescribed opcode field value and that at least one nonopcode field value of the respective machine language instruction; and providing the respective combination of decoded signals to combinational logic for converting the respective combination of decode signals into a respective address signal which points to a microprogrammed algorithm stored by the control storage unit means.

6 Claims, 3 Drawing Sheets

METHOD FOR EXECUTING MACHINE LANGUAGE INSTRUCTIONS

BACKGROUND OF THE INVENTION

1. Field of the Invention

The invention relates generally to machine language instructions and more particularly to methods for executing machine language instructions.

2. Description of the Related Art

A typical data processor is capable of executing programs written in any of a variety of programming languages. Before execution, however, each program is converted into a sequence of machine language instructions. Each machine language instruction ordinarily includes an opcode field which specifies an operation to be performed and a nonopcode field which, for example, may specify the data which is to be operated upon. For example, the opcode field of one type of machine language instruction specifies that certain registers be loaded with data currently stored at one or more memory locations in the data processor, and the nonopcode field includes operands which specify the addresses of the memory locations of the data to be loaded.

The execution of a machine language instruction by a data processor usually involves the execution by the data processor of multiple hardware level operations known as microoperations. The sequencing and control ofo microoperations involved in the execution of a machine language instruction often is achieved through the use of a microprogram stored in a control unit of the data processor. Such a microprogram, for example, may comprise an algorithm or an instruction set comprising an ordered sequence of instructions which control the execution of the microoperations involved in the execution of a machine language instruction.

Thus, the execution of respective machine language instructions ordinarily requires the linking of hte respective instructions to respective microprograms used to execute the instructions. The efficient linking of instructions and microprograms often can be a challenging task, especially where different respective machine language instructions have similar opcodes.

For example, at least one earlier data processor utilized a set of machine language instructions comprising two byte, sixteen bit, opcodes in which the respective first bytes of the opcodes of the instructions in the set were identical. One possible procedure to distinguish between the instructions of the set was to provide a one cycle 256-way branch. However, a 256-way branch would be wasteful of hardward resources since far fewer than 256 different microprograms were needed to sequence and control the various microoperations involved in the execution of the different machine language instructions in the set. Another procedure to distinguish between the instructions was to execute a microprogram branching algorithm which required several data processor clock cycles to complete. Unfortunately, the use of such an algorithm could slow the execution of the machine language instructions in the set to an unacceptable degree because it required too many data processor clock cycles to complete.

Consequently, another alternative procedure known as mapping often was used to distinguish between instructions having similar opcodes. In at least one earlier data processor, for example, mapping was accomplished by entering the entire two byte opcode of a respective machine language instruction into an instruction data register. The respective machine language instruction in the instruction data register was provided to mapping circuitry which generated a respective address signal combination corresponding to an address location in the control unit of the data processor. That address location typically was the location of starting microinstructions of a microprogram used for sequencing and controlling the microoperations involved in the execution of the respective machine language instruction.

While earlier methods for executing machine language instructions using respective microprograms stored in a control unit of a data processor generally have been accpeptable, there have been shortcomings with the execution of machine language instructions where certain operands occur in the nonopcode fields of those instructions significantly more frequently than other operands. More particularly, there have been problems in achieving a proper balance between the number of data processor clock cycles used to execute such instructions and the amount of hardware resources which must be dedicated to the execution of the instructions.

For example, in one particular data processor, one type of instruction known as a load control instruction caused the loading of any of a finite number of respective combinations of control registers of a data processor control unit with parameters used to control the operation of the data processor. Thus, the load control instruction could include any one of a finite number of different respective operands in the nonopcode field of the instruction which respectively corresponded to the different respective combinations of control registers to be loaded.

One possible procedure for executing the load control instruction involved the use of a single microprogram algorithm to load any respective combination of control registers designated in the nonopcode field of the instruction. The procedure would use the same algorithm regardless of which respective combination of control registers was designated by the nonopcode field of the instruction. In practice, however, certain combinations of control registers were loaded more frequently in the course of data processor operation than were other combinations. Therefore, it was desirable to utilize a procedure for executing the load control instruction which minimized the time necessary to load the most frequently loaded register combinations. Unfortunately, the use of the same algorithm regardless of which respective combination of control registers was to loaded did not result in such minimization.

Moreover, in order to optimize the usage of hardware resources, it frequently could be desirable to avoid unnecessary branching in the course of the execution of the load control instruction in the loading of the less frequently loaded register combinations. Thus, minimizing the time necessary to load the least frequently loaded register combinations through branching could be wasteful of hardware resources and often was not desirable.

Thus, there has existed a need for an improved method for executing machine language instructions, especially those instructions in which certain nonopcode field values occur significantly more frequently than others. The present invention meets this need.

SUMMARY OF THE INVENTION

The present invention provides a novel method for use in a data processor for executing respective machine language instructions provided by a cache storage unit using respective microinstructions stored in respective address locations of a control storage unit. The method comprises a step of receiving from the cache at least one respective machine language instruction which includes an opcode field and nonopcode field. Substantially in the course of one data processor clock cycle, the respective opcode and nonopcode fields are decoded so as to produce a combination of decoded signals. Moreover, substantially in the course of the same one data processor clock cycle, a plurality of signals from the combination are provided to remapping circuitry which generates a respective branch address signal combination corresponding to a respective address location of the control storage unit.

The method of the present invention provides a method for executing machine language instructions, especially instructions in which certain nonopcode field values occur significantly more frequently than others. The new method advantageously can be used to speed the execution of those certain machine language instructions without significantly increasing the hardware resources which must be dedicated to instruction execution.

These and other features and advantages of the present invention will become more apparent from the following detailed description of an exemplary embodiment thereof, as illustrated in the accompanying drawings.

BRIEF DESCRIPTION OF THE DRAWINGS

The purpose and advantages of the present invention will be apparent to those skilled in the art from the following detailed description in conjunction with the appended drawings in which.

DESCRIPTION OF THE PREFERRED EMBODIMENT

The present invention comprises a novel method for executing machine language instructions using microinstructions. The following description is presented to enable any person skilled in the art to make and use the invention, and is provided in the context of a particular application and its requirements. Various modifications to the preferred embodiment will be readily apparent to those skilled in the art, and the generic principles defined herein may be applied to other embodiments and applications without departing from spirit and scope of the invention. Thus, the present invention is not intended to be limited to the embodiment and method shown, but is to be accorded the widest scope consistent with the principles and features dislosed herein.

Figures 1, 2:
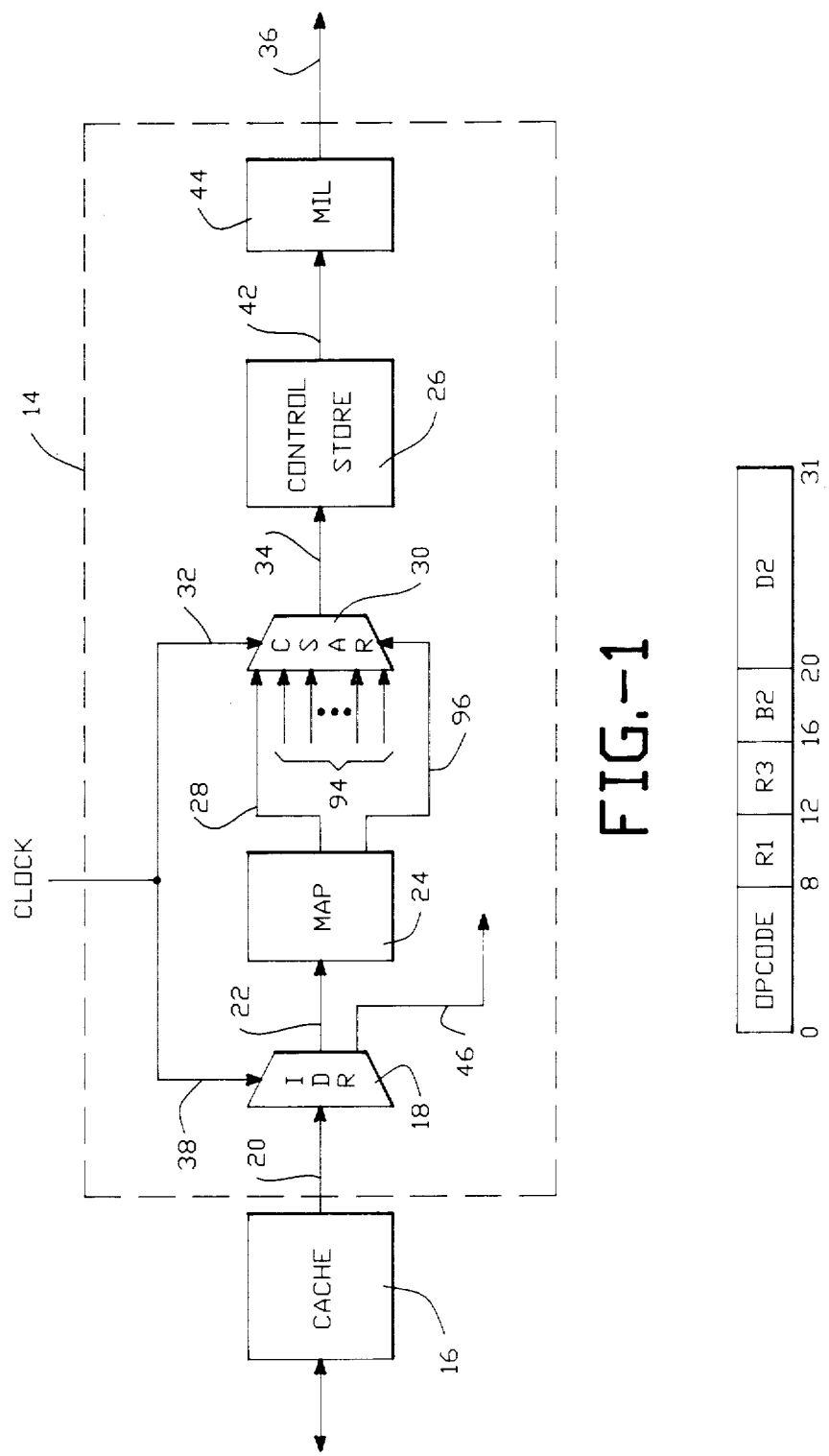
FIG. 1 is a block diagram of a data processor control unit used to implement the method of the present invention.
FIG. 2 is an instruction format for the LOAD CONTROL instruction which can be implemented using the method of the present invention.

The illustrative block diagram of FIG. 1 shows an exemplary data processor control unit 14 which is used to implement the method of the present invention. There is also shown a cache storage unit 16 which stores machine language instructions to be executed according to the method. The cache 16 provides on lines 20 machine language instructions to an instruction data register 18. Upon the provision of a first data processor clock signal on line 38, the instruction data register 18 provides on lines 22 two eight bit bytes of the provided machine language instruction to mapping circuitry 24. The mapping circuitry 24 maps the respective two bytes of the provided machine language instructions, as more fully explained below, to respective branch address locations of a control storage unit 26. The respective branch address signal combinations are provided on lines 28 and point to a respective address location of the control storage unit 26 wherein microinstructions involved in executing the instruction can be found. Respective branch address signal combinations provided on lines 28 are respectively entered into a control store address register (CSAR) 30. Upon the provision of a second data processor clock signal on line 32, the CSAR 30 provides a respective address signal combination entered therein to the control storage unit 26.

The control storage unit 26 stores microprograms comprising ordered sets of microinstructions used to execute the respective provided machine language instructions. More specifically, the stored microprograms are used to control hardware level microoperations, involved in the execution of the respective machine language instructions. In response to respective address signal combinations provided on lines 34, the control storage unit 26 provides microinstructions from respective addressed microprograms on lines 42. The respective microinstructions are provided to microinstruction interpretation logic 44 which interprets the microinstructions and provides corresponding control signals on lines 36 which are used to perform hardware level microoperations involved in the control of data processor operation.

Referring now to the exemplary drawings of FIG. 2, there is illustrated an instruction format for an instruction known as the LOAD CONTROL (LCTL) instruction which is a machine language instruction used to load different respective combinations of control registers which are not shown and which form no part of the present invention. The control register hold various data processor control signal parameters used to control the operation of a data processor. In a particular data processor which includes the control unit 14 of FIG. 1 and which can employ the method of the present invention, there are sixteen such control registers, and the LCTL instruction is used to cause different combinations of those registers to be loaded with control signal parameters.

More particularly, the LCTL instruction includes one eight bit opcode field, first and second four bit operand fields, and a third sixteen bit operand field. The respective first and second operand fields provide respective designators $R_1$ and $R_3$ which identify the respective range of control registers to be loaded. More particularly, the range to loaded starts with the control register designated by $R_1$ and ends with the control register designated by $R_3$. The third operand field provides respective designators $B_2$ and $D_2$ which respectively identify the respective data processor memory locations of control signal parameters to be loaded into the designated range of control registers.

It will be appreciated that the LCTL instruction performs an operation for which any of several different combinations of respective designators $R_1$ and $R_3$ can be respectively included in the first and second operand fields. Each different operand corresponds to the loading of a different combination of control registers. Thus, the execution of the LCTL instruction is suitable for optimization so as to minimize the time required to perform the microoperations used to load the most frequently loaded combinations of registers.

Further details of a presently preferred method in accordance with the principles of the invention will be explained with specific reference to the execution of the LCTL instruction. Although it should be appreciated that the method can be applicable to other instructions as well.

Referring once again to FIG. 1, the 32-bit LCTL instruction is provided on lines 20 by the cache 16 and is entered into the instruction data register 18. Upon the provision of the first data processor clock signal on line 38, the eight bit opcode field and the first and second operand fields are provided on lines 16 to the mapping circuitry 24. The third operand field is provided on lines 46 to address generation logic which is not shown and forms no part of the present invention.

Figure 3:
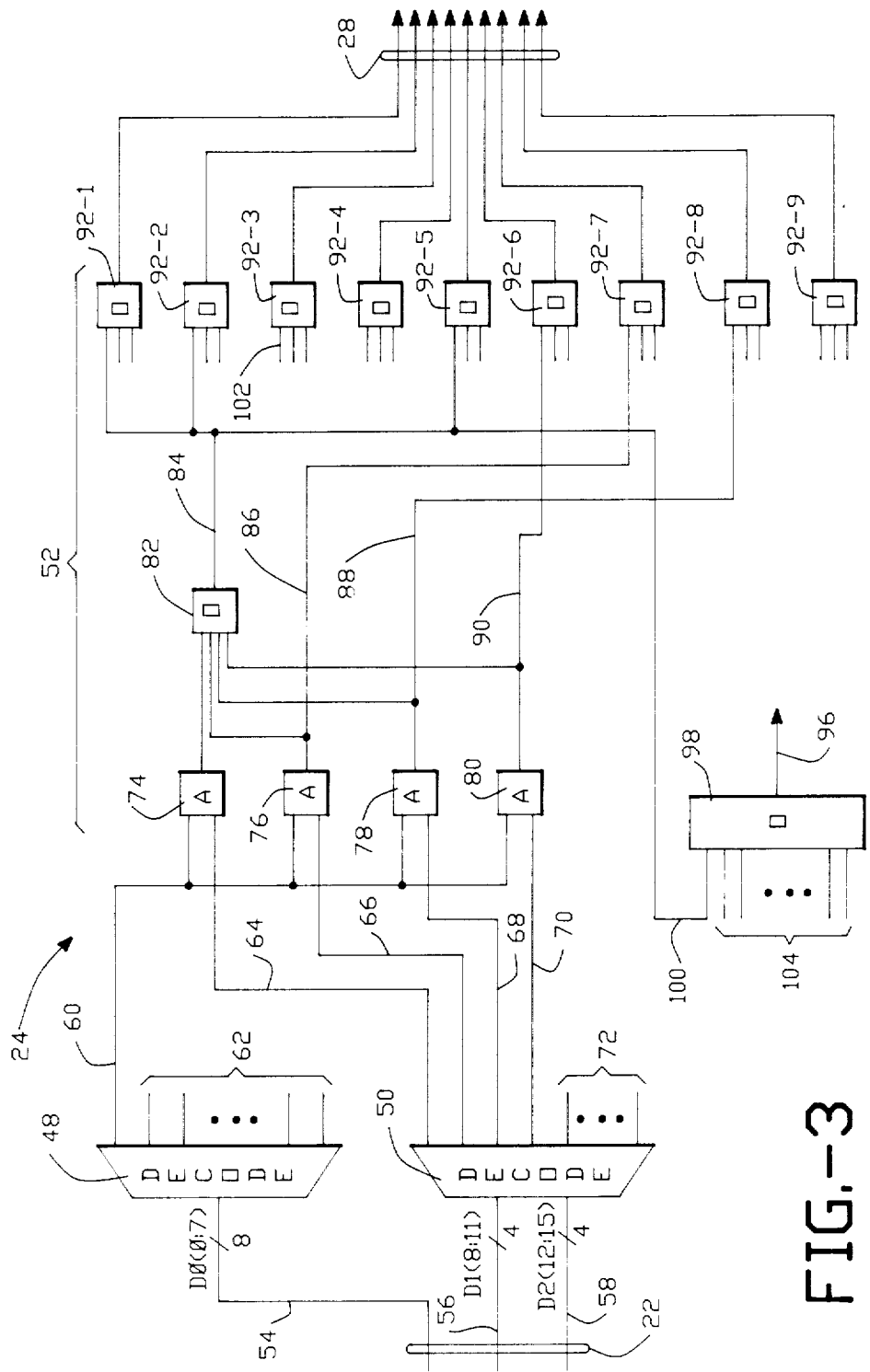
FIG. 3 is a logic circuit diagram of the mapping circuitry of the control unit of FIG. 1.

Referring now to the illustrative drawings of FIG. 3, there are shown details of the mapping circuitry 24. The mapping circuitry 24 is a combinational logic network which includes respective first and second decoding circuits 48 and 50 and remapping circuitry generally indicated by bracket 52. The respective first and second decoding circuits 48 and 50 are coupled to receive signals provided on lines 22 by the instruction data register 18.

More particularly, the eight bit opcode field is provided to the first decoding circuit 48 on lines 54. Four bits of the first operand field which provide designator $R_1$ are provided to the second decoding circuit 50 on lines 56, and four bits of the second operand field which provide designator $R_3$ are provided to the second decoding circuit 50 on lines 58.

The first decoding circuit 48 decodes the opcode field signals and produces on lines 60 and the lines designated by bracket 62 a first combination of decoded signals. Similarly, the second decoding circuit 50 decodes the first and second operand field signals and provides on lines 64, 66, 68, 70 and the lines indicated by bracket 72 a respective second combination of decoded signals.

The remapping circuitry indicated by bracket 52 includes respective AND logic gates 74, 76, 78 and 80. Each of these respective AND logic gates is coupled to receive decoded signals from the first combination of decoded signals provided on line 60. Moreover, gate 74 is coupled to receive signals from the second combination of decoded signals provided on line 64; gate 76 is coupled to receive signals from the second combination provided on lines 66; gate 78 is coupled to receive signals from the second combination provided on line 68; and gate 80 is coupled to receive signals from the second combination provided on line 70. Furthermore, each respective AND logic gate 74, 76, 78, and 80 provides a respective signal to OR logic gate 82, and OR logic gate 82, in response, provides a signal on line 84.

The remapping circuitry also includes a nine gate array of OR logic gates 92-1–92-9. OR logic gate 82 is coupled via line 84 to provide signals to respective OR logic gates designated 92-1, 92-2 and 92-5 of the array. Moreover, AND logic gate 76 is coupled via line 86 to provide signals to OR logic gate 92-7; AND logic gate 78 is coupled via line 88 to provide signals to OR logic gate 92-8; and AND logic gate 80 is coupled via line 90 to provide signals to OR logic gate 92-6.

The array of OR logic gates 92-1–92-9 provides on lines 28 respective branch address signal combinations in response to the provision of the respective opcode field and the first and second operand fields of the respective first and second decoding circuits 48 and 50. The signals provided on lines 28 are provided to the CSAR 30 as respective branch address signal combinations. Furthermore, AND logic gates 74, 76, 78 and 80 and OR logic gate 82 cooperate to remap decoded signals provided on respective lines 60, 64, 66, 68 and 70 to various OR logic gates in the array of logic gates 92-1–92-9. Thus, the mapping circuitry maps the respective opcode and the first and second operand fields of the LCTL instruction to respective address locations of the control storage unit 26.

From FIG. 1 it can be seen that the CSAR 30 can receive signal combinations provided to it on any one of a variety of different lines generally indicated by bracket 94. In order to instruct the CSAR 30 to enter the branch address signal combination provided on lines 28, an enable signal is provided on line 96. Referring once again to FIG. 3, OR logic gate 98 is coupled to receive on line 100 the signals provided by OR logic gate 82 on line 84. OR logic gate 98, in response, provides an enabling signal to the CSAR 30 on line 96.

It should be noted that the respective OR logic gates 92-1–92-9 of the array can be used to produce branch address signal combinations corresponding to other instructions as well. For example, decoded signals provided by the respective first and second decoding circuits 48 and 50 on a combination of the lines respectively indicated by brackets 62 and 72 can be remapped to other address signal combinations by other remapping circuitry, which is not shown and which forms no part of the present invention. For example, such other remapping circuitry which is not shown, could be coupled to provide signals to OR logic gate 92-3 on line 102. Moreover, for example, such other remapping circuitry which is not shown is coupled to provide signals to one or more of the lines indicated by bracket 104 coupled to OR logic gate 98. Thus, it should be appreciated that the mapping circuitry 24 includes additional remapping circuitry which is not shown and which is not relevant to the method of the present invention.

In practice, for a particular data processor which implements the preferred embodiment and method disclosed herein, four combinations of control registers are loaded in the course of data processor operation significantly more frequently than are other combinations of the control registers. Thus, the speed of execution of the LCTL instruction can be enhanced by optimizing the speed with which the four more frequently loaded control register combinations can be loaded. The four most frequently loaded register combinations, of course, correspond to four different $R_1$ and $R_3$ designator combinations.

In accordance with the principles of the present invention, the optimization is achieved by decoding the LCTL isntruction; and by remapping the four most frequently occurring LCTL instructions, which correspond to the four most frequently loaded register combinations, to four respective microprogrammed algorithms stored in the control storage unit 26. In the case of $R_1$ and $R_3$ designator combinations which do not correspond to any of the four most frequently loaded register combinations, hardware resources of the data processor are more efficiently utilized using the branch address field in a first microinstruction of the LCTL instruction to branch to a generalized microprogrammed algorithm which is stored in the control storage unit 26 and which is adapted to sequence and control the execution of a general LCTL instruction.

Figure 4:
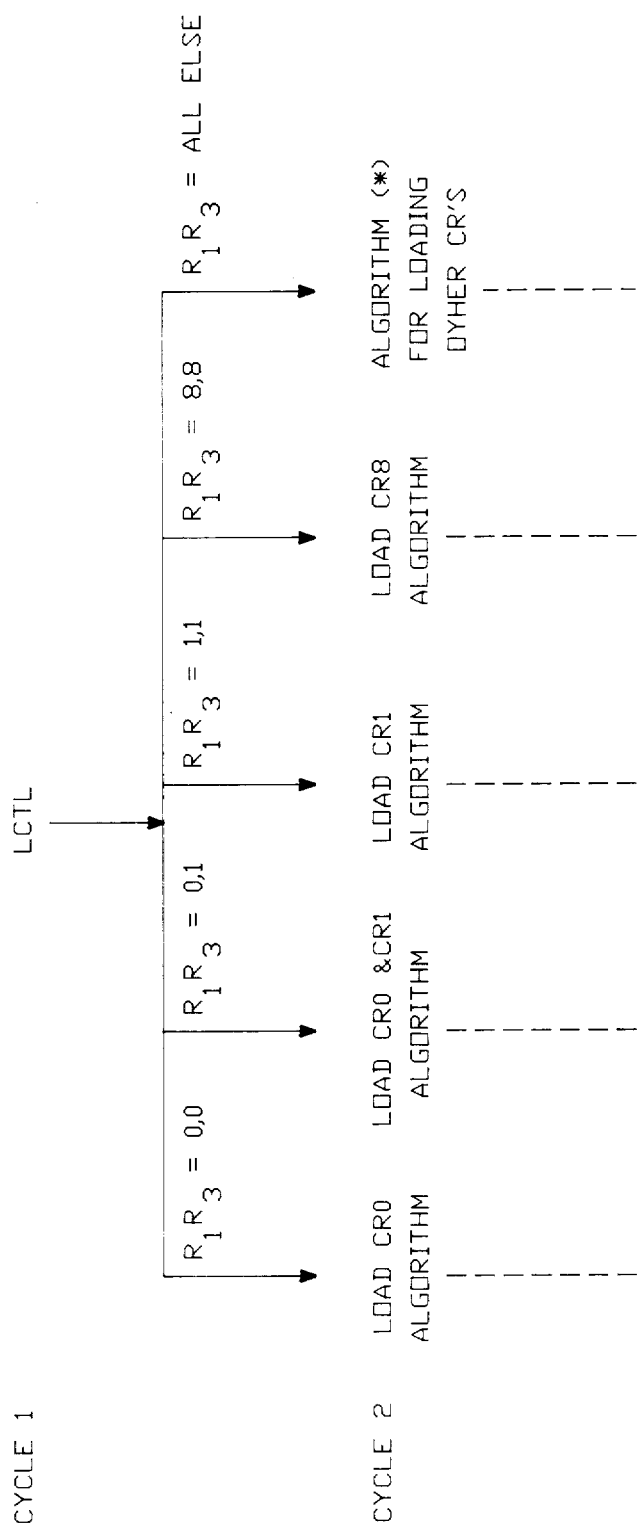
FIG. 4 is a flow diagram illustrating signal flow in the control unit of FIG. 1 of the LOAD CONTROL instruction of FIG. 2 in accordance with the method of the present invention.

Referring to the descriptive diagrams of FIG. 4, it will be understood that the execution of the LCTL instruction involves decoding and remapping in one instruction processor clock cycle so as to provide a remapped branch address signal combination to the CSAR 30 during a first data processor clock cycle. The execution further includes the provision of the address signal combination to the control storage unit 26 during a second data processor clock cycle. Moreover, during the second data processor clock cycle a microprogrammed algorithm pointed to by the branch address starts execution.

The four most frequently occurring cases of the LCTL instruction (in hexidecimal representation) correspond to ($R_1$, $R_3$) designations of either (O, 0), (0,1), (1, 1), or (8, 8). As explained above, the four most frequently occurring ($R_1$, $R_3$) designations in the first and second operand field correspond to the four most frequently loaded combinations of control registers. Referring to FIGS. 1 and 4, it will be appreciated that during a first data processor clock cycle, the LCTL instruction resides in the instruction data register 18. Upon the provision of the first data processor clock signal on line 38, the LCTL instruction is provided on lines 22 to the mapping circuitry 24. The first decoding circuit 48 decodes the opcode field and provides a logical level 1 signal on line 60. The second decoding circuit 50 decodes the first and second operand fields such that an $R_1$, $R_3$ designation of (0, 0) results in logical level 1 signal on line 64 and logical level 0 signals on lines 66, 68, 70. Similarly, a (0,1) designation results in a logical level 1 signal on line 66 and logical level 0 signals on lines 64, 68 and 70; a (1, 1) designation results in the provision of a logical level 1 signal on line 68 and logical level 0 signals on lines 64, 66 and 70; and an (8, 8) designation results in a logical 1 level signal on line 70 and logical level 0 signals on lines 64, 66, and 68. Finally, the occurrence of any one of the four most frequently occurring cases of the LCTL instruction just described results in the provision of a logical level 1 signal being provided on line 96 which enables the CSAR 30 to receive the branch address signal combination provided on lines 28.

Thus, for example, in a presently preferred embodiment of the invention when the LCTL instruction includes an ($R_1$, $R_3$) designation of (0, 0), the branch address signal combination provided on lines 28 corresponds to address 190-hex of the control storage unit 26. Similarly, an ($R_1$, $R_3$) designation of (0, 1) is mapped to branch address signal combination 194-hex; an ($R_1$, $R_3$) designation of (1, 1) is mapped to branch address signal combination 192-hex; an ($R_1$, $R_3$) designation of (8, 8) is mapped to branch address signal combination 198-hex; and all other ($R_1$, $R_3$) designations use the branch address field in a first microinstruction of the LCTL instruction to branch to a branch address signal combination indicated by the symbol * the illustrative diagram of FIG. 4.

Upon the provision of the second data processor clock signal on line 32 to the CSAR 30, a respective address signal combination residing in the CSAR 30 is provided on lines 34 to the control storage unit 26. A respective branch signal address location of 190-hex, for example, will result in the execution of a microprogrammed algorithm which will cause the loading of a control register numbered zero. A branch address signal combination of 192-hex will result in the execution of a microprogrammed algorithm which will cause the loading of control registers numbered zero and one. A branch address signal combination of 192-hex will result in the execution of a microprogrammed algorithm which will cause the loading of control register numbered one. A provision of a branch address signal combination of 198-hex will result i the execution of a microprogrammed algorithm which will cause the loading of a control register numbered 8. Finally, a branch address signal combination of * will cause the execution of a general algorithm for loading any of the remaining combinations of control registers which can be loaded by the LCTL instruction. The loading of the respective control registers for each of the branch address signal combinations described above occurs in the course of processing the respective algorithms (microprograms).

Thus, it will be appreciated that the method of the present invention advanatageously permits the optimization of the execution of machine language instructions by mapping the opcode and nonopcode portions of the instructions to address locations within a control storage unit where microprogrammed algorithms are stored for controlling the rapid execution of the most recurrent cases of the instructions. Moreover, less frequently occurring cases can use the branch address in the microinstruction to branch to more generalized algorithms which, although not as fast the other algorithms, limit the hardware resources necessary to execute the instruction.

Finally, although the inventive method is illustrated and explained in the context of one particular machine language instruction, the LCTL instruction, and one particular data processor control unit 14, it should be appreciated that the invention is applicable to other types of machine language instructions as well. For example, the method is applicable to instructions of the general type which include an opcode field corresponding to the operation of moving data and which include a nonopcode field which corresponds to a length field which designates the actual length of the data.

It will be understood that the abovedescribed embodiment and method is merely illustrative of many possible specific embodiments and methods which can represent the principles of the invention. Numerous and varied other arrangements readily can be devised in accordance with these principles without departing from the spirit and scope of the invention. Thus, the foregoing description is not intended to limit the invention which is defined by the appended claims in which:

What is claimed is:

1. For use in a data processor, a method for mapping a respective machine language instruction stored by cache storage unit means to a respective microprogrammed algorithm stored by control storage unit means, wherein the respective machine language instruction includes an opcode field with a prescribed value and includes at least one nonopcode field with one of a plurality of values, the method comprising the steps of:

in the course of one data processor clock cycle,
(i) providing the respective machine language instruction to means for converting the prescribed opcode field and the at least one nonopcode field of the respective machine language instruction into a respective first combination of signals which corresponds to the prescribed opcode field value and the at least one nonopcode field value of the respective machine language instruction; and
(ii) providing the respective first combination of signals to combinational logic means for coverting the respective first combination of signals into a respective address signal which points to a microprogrammed algorithm stored in the control storage unit means.

2. The method of claim 1 and further comprising the step of:
entering the respective machine language instruction into respective first register means for holding the respective instruction.

3. The method of claim 1 and further comprising the step of:
entering the respective address signal into respective second register means for holding the respective address signal.

4. For use in a data processor, a method for mapping a respective machine language instruction stored by cache storage unit means to a respective microprogrammed algorithm stored by control storage unit means, wherein the respective machine language instruction includes an opcode field with a prescribed value and includes at least one nonopcode field with one of a plurality of values, the method comprising the steps of:

entering the respective machine language instruction into respective first register means for holding the respective instruction;
substantially in the course of one data processor clock cycle,
(i) providing the respective machine language instruction to means for converting the prescribed opcode field and the at least one nonopcode field of the respective machine language instruction into a respective first combination of signals which corresponds to the opcode field value and the at least one nonopcode field value of the respective machine language instruction, and
(ii) providing the respective first combination of signals to combinational logic means for a converting the respective first combination of signals into a respective address signal which points to a microprogrammed algorithm stored in the control storage unit means.

5. The method of claim 4 wherein the opcode field of the respective machine language instruction specifies a register loading operation; and
the nonopcode field of the respective machine language instruction specifies at least a one particular register from a set of registers which is to be loaded.

6. The method of claim 5 wherein the set of registers comprise at least one control register.

* * * * *